United States Patent [19]

Bouchet

[11] Patent Number: 4,867,002

[45] Date of Patent: Sep. 19, 1989

[54] TOOTHING AND GEARS MADE THEREWITH

[76] Inventor: Jacques Bouchet, 9 square Gabriel Fauré 75017 Paris, France

[21] Appl. No.: 194,986

[22] PCT Filed: Sep. 2, 1987

[86] PCT No.: PCT/FR87/00341

§ 371 Date: May 3, 1988

§ 102(e) Date: May 3, 1988

[87] PCT Pub. No.: WO88/02081

PCT Pub. Date: Mar. 24, 1988

[30] Foreign Application Priority Data

Sep. 9, 1986 [FR] France ............... 86 12609

[51] Int. Cl.4 .................................... F16H 55/08
[52] U.S. Cl. .................................. 74/462; 74/437
[58] Field of Search ................. 74/437, 457, 462

[56] References Cited

U.S. PATENT DOCUMENTS

| | | | |
|---|---|---|---|
| 1,142,051 | 6/1915 | O'Connor | 74/437 |
| 2,447,104 | 8/1948 | Trbojevich | 74/462 |
| 2,842,977 | 7/1958 | Stibitz | 74/437 |
| 2,897,765 | 8/1959 | Kitano | 74/437 X |
| 3,753,378 | 8/1973 | Bishop | 74/422 |
| 4,011,764 | 3/1977 | Friedrichshafen | 74/422 |

FOREIGN PATENT DOCUMENTS

| | | |
|---|---|---|
| 2203233 | 8/1973 | Fed. Rep. of Germany . |
| 542099 | 12/1922 | France . |
| 1392007 | 1/1965 | France . |
| 2104354 | 4/1972 | France . |
| 2195304 | 3/1974 | France . |
| 523811 | 6/1972 | Switzerland . |

OTHER PUBLICATIONS

Product Engineering, 3-14-60, "Noncircular Gears", pp. 59–66.

Primary Examiner—Allan D. Herrmann
Attorney, Agent, or Firm—Griffin, Branigan & Butler

[57] ABSTRACT

A tooth according to the invention is such that its flank (foot flank) (1B) situated inside the not entirely circular pitch curve (PA) follows an involute of a circle determined by a pressure angle (p), and has a face (2B) outside the pitch curve such that its current point (M) is determined by the intersection of the flank (1A) of the co-operating tooth with the tangent to the circles defining the flank (1A) passing through the instantaneous point of contact (N) of the pitch curves (P'A, P'B). The pitch curves may be circular arcs, logarithmic spiral arcs, elliptical arcs, or a succession of such arcs around an open or a closed curve in order to form gearing. Some lengths of the pitch curves may have no teeth.

7 Claims, 4 Drawing Sheets

FIG_1

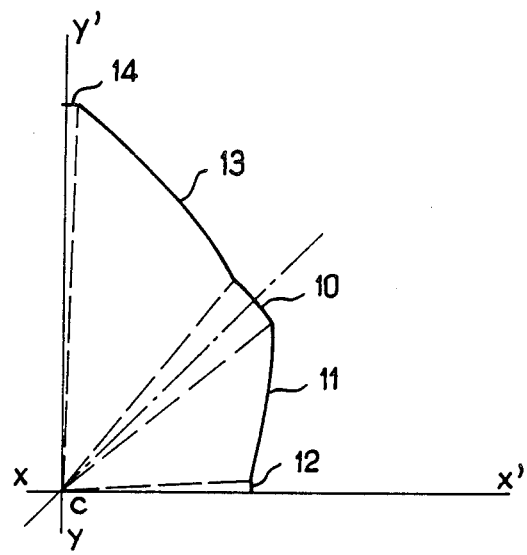
FIG. 2
FIG. 3
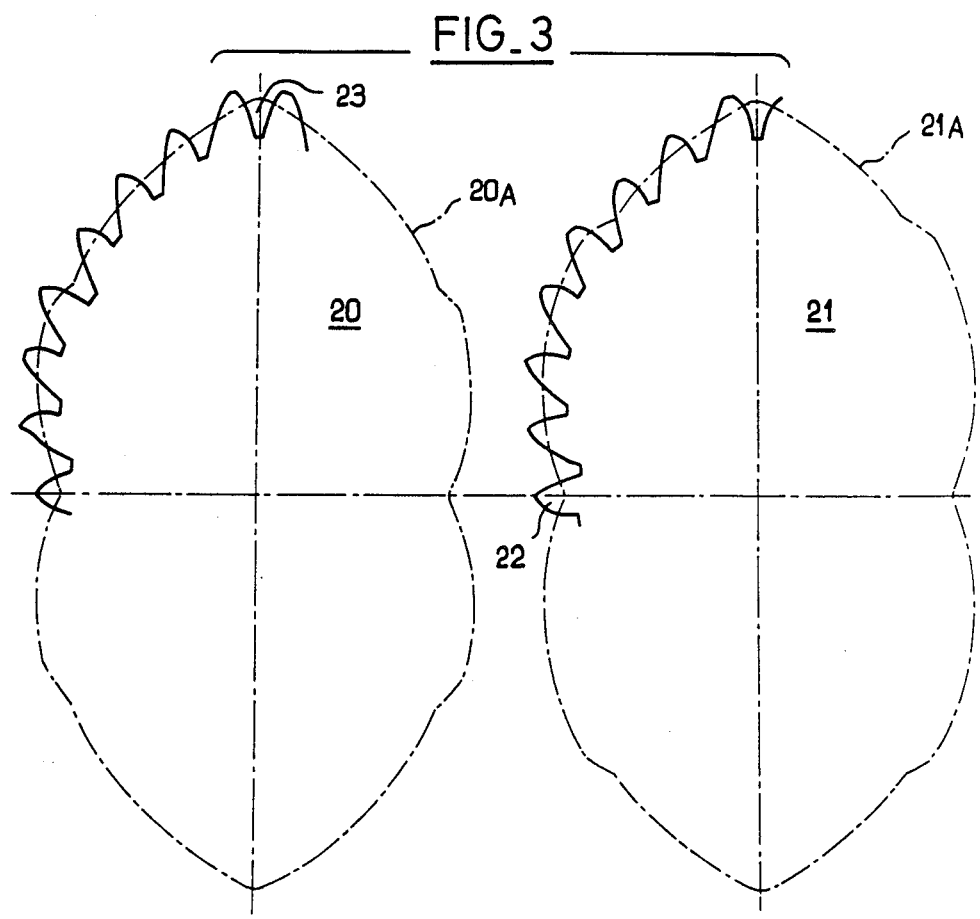

FIG_4

TOOTHING AND GEARS MADE THEREWITH

Conventionally, the transmission of drive from one solid to another about their respective axes by means of toothing is limited to the special cases of cams, gearing, or other rack and pinion systems.

BACKGROUND OF THE INVENTION

In gearing, the pitch curve of each solid is a circle (as in cylindrical or conical gearing); in rack and pinion systems, the pitch curve of the rack is a circle of infinite radius. In most cases, the profiles of the teeth with which said solids are equipped are involutes to circles of constant diameter (or a straight line in the limiting case of a rack).

With such an arrangement, when one of the solids is subjected to uniform rotation, the other solid is driven with uniform rotation under good conditions concerning the arc of contact of the gearing, and the angle at which the teeth cooperate (optimum strength relative to transmission forces), and, in addition, is easy to make. The arrangement of the toothing thus corresponds to requirements for so-called standard toothing.

There are other types of toothing which are applied to non-circular pitch curves (in particular elliptical curves) in which uniform rotation of one of the solids gives rise to non-uniform rotation of the driven solid. However, the forms of toothing implemented do not satisfy standard criteria and as a result have not been applied in industry.

The present invention seeks to provide standard toothing in which each tooth is defined by a profile satisfying the conditions mentioned above, concerning arc of contact, ability to withstand the forces to be transmitted, and ease of cutting, even through the pitch curves thereof (which may be open or closed) are neither circles or nor straight lines, thereby providing non-uniform motion of the driven solid about its axis of rotation, said motion thus including stages of angular acceleration or deceleration for uniform motion of the driving solid.

SUMMARY OF THE INVENTION

More precisely, in a first aspect the present invention provides a tooth for coupling by meshing two solids which roll over each other along their respective pitch curves without sliding, said curves being other than entirely circular, the tooth being characterized in that the profile of its active surface is constituted by a flank portion (foot flank portion) situated inside the pitch curve and in the form of an involute of a circle determined for a given pressure angle, and by a face portion (head flank portion) outside the pitch curve and determined by calculation as a function of the pitch curve in such a manner that they instantaneous point of contact between the face portion (head flank portion) of the tooth and the flank portion (foot flank portion) of the co-operating tooth is situated on the tangent to the circle defining the flank portion (head flank portion) and passing through the instantaneous point of contact between the pitch curves, i.e. satisfying the envelope principle.

In a second aspect, the invention lies in toothing comprising a plurality of teeth as defined above about a pitch curve including at least one toothed arc following a logarithmic spiral.

In a variant embodiment of this toothing, the pitch curve comprises at least one elliptical toothed arc.

It may be observed in this respect that a particular embodiment of the invention lies in the presence of at least one circular arc in the pitch curve, where a circular arc is a special case either of a logarithmic spiral (having a right angle as its characteristic angle) or else of an ellipse (with the distance between the focuses being zero).

Toothing in accordance with the invention may also include a toothless arc of pitch curve between two toothed arc portions, said toothless are being tangential at its ends to the flank (foot flank) and face respectively of the teeth which it interconnects. This arc of the pitch curve may be an arc of a logarithmic spiral or of an ellipse.

Finally, in a third aspect, the present invention provides gearing fitted with toothing as defined above and in which each of the solids constituting the gearing has a closed pitch curve comprising a succession of associated arcs of a circle and/or of an ellipse and/or of a logarithmic spiral. In a variant of this gearing formed by a rack and pinion assembly, the rack-forming solid comprises an open pitch curve likewise constituted by a succession of line segments and/or circular arcs and/or logarithmic spirals associated with corresponding arcs formed by the pitch curve of the pinion.

It may be observed that toothed pitch curve portions of toothing in accordance with the invention may be rectilinear, helical, or herringbone.

BRIEF DESCRIPTION OF THE DRAWINGS

An embodiment of the invention is described by way of example with reference to the accompanying drawings, in which:

FIG. 2 is a fragmentary outline diagram of a pitch curve for gearing in accordance with the invention;

FIG. 3 is a plan view of gearing obtained by fitting the FIG. 2 pitch curve with teeth drawn in accordance with the invention;

DETAILED DESCRIPTION OF THE INVENTION

Figure 1:
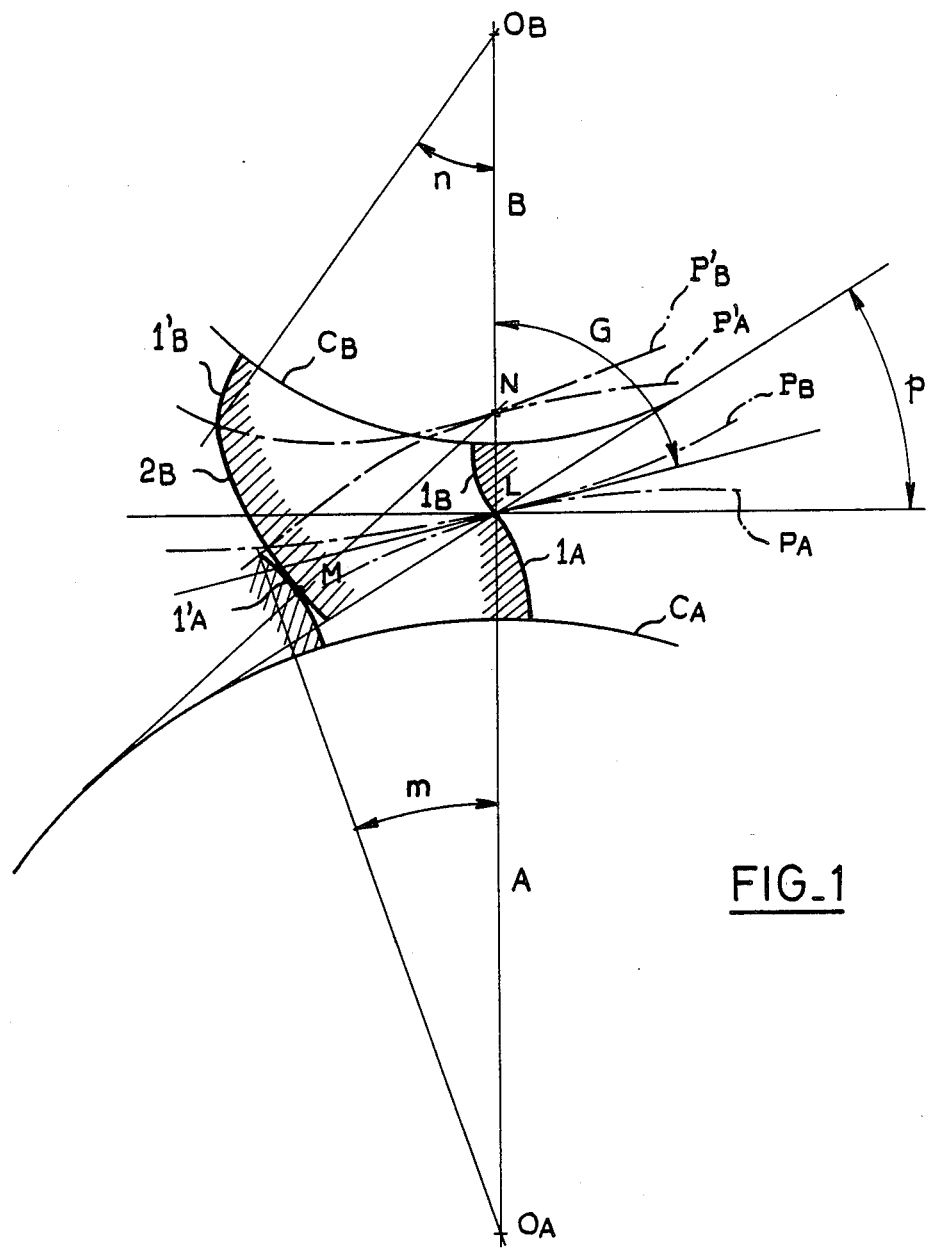
FIG. 1 is an explanatory diagram of the point-by-point construction of a tooth in accordance with the invention.

Reference is made initially to FIG. 1 which shows two solids A and B symbolized by their respective centers of rotation OA and OB and by portions of their pitch curves PA and PB which come into contact on the line of centers at L. The common tangent to these curves at L is at an angle G to the line of centers. it is recalled that if the curves PA and PB are circles, then G is a right angle. If the curves PA and PB are logarithmic spirals, then G is constant and characteristic of each of the spirals centered on OA and OB.

According to the invention, each of the pitch curves is fitted with a tooth whose flank portion (foot flank portion) 1A, 1B situated inside its pitch curve has a profile in the form of an involute of a circle. Each of the circles CA and CB which is used for determining the involute is determined by the desired pressure angle p. In order to be sure of obtaining meshing without jamming, G is selected to be greater than the complement of above-mentioned angle p. The profiles 1A and 1B are thus exactly defined; they constitute the flanks (foot flank) of the corresponding teeth.

By way of example, one method amongst others for determining the profile of the face (head flank) of each tooth is mentioned in which the solid A is rotated in the positive direction through an angle m. The pitch curves PA and PB then occupy positions P'A and P'B and are in contact with each other at point N. Since the solid B has rotated in the negative direction without slip through an angle n, the flanks (foot flanks) 1A and 1B are in their positions 1'A and 1'B. The point of contact between the flank (foot flank) 1'A and the face (head flank) of the tooth belonging to the solid B is defined by the point M where said flank (foot flank) intersects the tangent to the circle CA passing through the point N. The face 2B is thus determined point-by-point and the co-ordinates of its current point can be determined, for example, in a frame of reference related to B. It is also known how to calculate the limits of said face (head flank) so as to ensure, in particular, that these two teeth remain permanently in contact throughout the period they are meshed.

The face (head flank) which extends the flank (foot flank) 1a is determined in the same manner by interchanging the roles of the solids A and B and their directions of rotation. As for the flanks (foot flanks), they are fixed a priori, in order to take account of the desired width for each tooth.

Thus, provided the pitch curve of each solid is known, a method is available for determining the profile of standard teeth with which it can be fitted. There are limits to the shape and appearance of pitch curves which can be fitted with standard teeth, but elliptical arcs of adequate excentricity, or logarithmic spiral arcs of adequate characteristic angle are perfectly suitable for receiving standard toothing. Since the co-ordinates of the current point of a face of a tooth can be calculated, it is straightforward to provide software for performing the calculation or even to associate a programmed computer with an automatic cutting machine. It may be observed that this method still applies when the pitch curve is an arc of a circle. In this case, the face of each tooth is likewise the involute of a circle.

By way of example, FIG. 2 shows one fourth of a pitch curve from which the other fourths are deduced by symmetry about two axes xx' and yy'. Thus, in each quadrant, the pitch curve is constituted by an arc of a circle 10 centered on the angle bisecting the quandrant and extending over an angle of 8 grades and having a radius equal to 55 millimeters. Towards the axis xx', this circular arc is followed by a logarithmic spiral arc 11 coming closer to the center C and subtending an angle at the center equal to 44.5 grades, being itself followed by a circular arc 12 subtending an angle at the center equal to 1.5 grades and having a radius equal to 35.502 millimeters. going towards the other axis yy', the circular arc 10 is extended by a logarithmic spiral arc 13 subtending an angle at the center of 45 grades and going away from the center C, and is itself followed by a circular arc 14 of radius 70.690 millimeters and subtending an angle at the center equal to 1 grade.

It is possible to calculate the quarter pitch curve corresponding to that shown and capable of rolling thereover without sliding. This corresponding curve will comprise: matching the circular arc 14, a circular arc of 35.188 millimeters radius and an angle at the center of 2.009 grades matching the logarithmic spiral arc 13, a spiral arc going away from the center from the above-mentioned circular arc with an angle at the center of 60.099 grades; matching the circular arc 10, a circular arc having a radius equal to 55.878 millimeters at an angle at the center of 7.158 grades; matching the spiral arc 11, a spiral arc going away from the center from the preceding circular arc, over an angle at the center equal to 29.977 grades; and finally matching the circular arc 12, a circular arc having a radius of 70.386 millimeters and extending over an angle at the center equal to 0.757 grades.

Once associated pitch curves have been determined, a number of teeth is selected, and mainly for reasons of symmetry, this number is of the form $N=4n+2$, in the example shown. Thus, in the example each solid will be fitted with 30 teeth (see FIG. 3) which, being spaced regularly along each pitch curve will have a "thickness" measured along said curve equal to 5.881 millimeters, with calculation showing that the total perimeter of each pitch curve is equal to 352.860 millimeters. Naturally, the number of teeth is a function of the forces to which the various teeth are to be subjected and the teeth could be irregularly distributed around the perimeter with different "thicknesses".

FIG. 3 shows two bodies 20 and 21 whose pitch curves 20A and 21A are matched so that they roll over each other without sliding as described above with reference to FIG. 2. The characteristic angle of the logarithmic spiral arcs in both of these bodies is 71 grades, and the pressure angle p has been selected to be equal to the complement of this characteristic angle, i.e. 29 grades. Once all of the parameters necessary for calculating the profiles of the teeth have been determined, the teeth themselves on each of the bodies 20 and 21 are drawn by applying the method described with reference to FIG. 1. The toothing obtained is standard and the solids 20 and 21 are capable of meshing with each other by placing the tooth 22 of the solid 21 in the gap 23 of solid 20.

Figure 4:
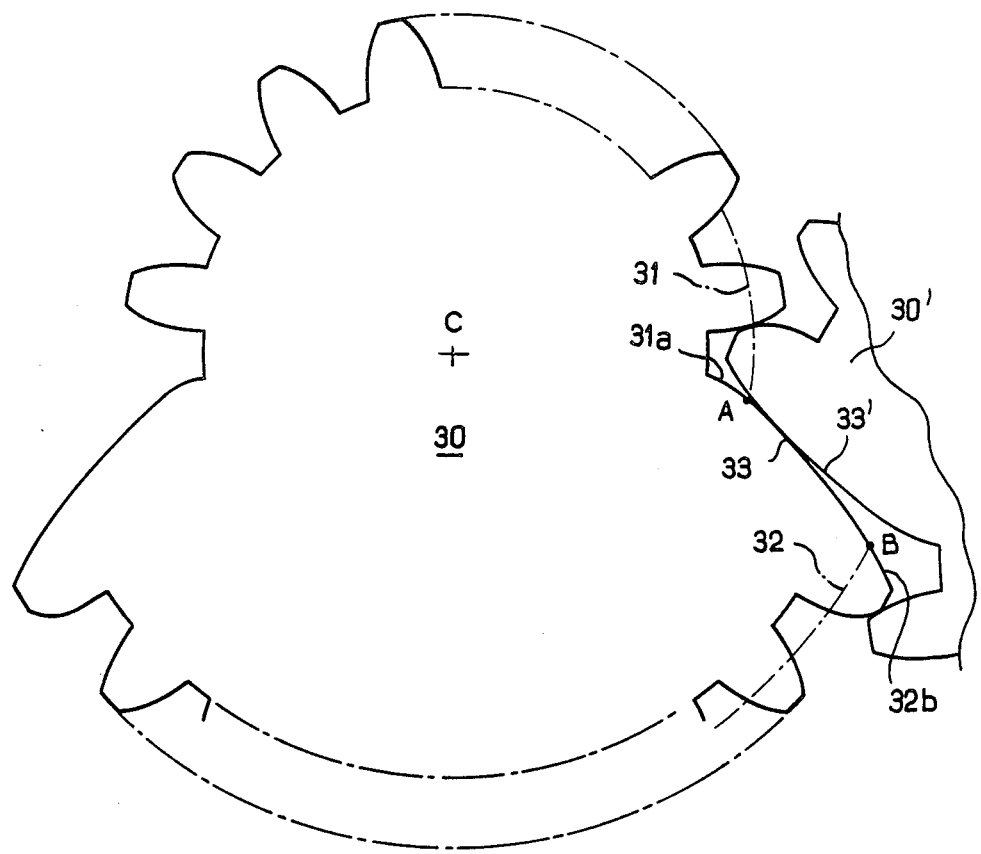
FIG. 4 is a view of particular gearing in accordance with the invention suitable or meshing with itself.

FIG. 4 shows a special case of gear wheel 30 in accordance with the invention where the pitch curve is constituted by two circular arcs 31 and 32 of different radiuses interconnected by a logarithmic spiral arc 33 such that at the connection points A and B the arc 33 is tangential respectivey to the circular involute flank (boot flank) 31a of the bottom tooth and the circular involute space 32a of the top tooth. The figure shows the portion 33 of the gear wheel 30 engaging the portion 33' of the associated gear wheel 30' which in this case is identical to the gear wheel shown in full, with the arc portions 33 and 33' rolling over each other without sliding while the adjacent teeth mesh. The spiral arc 33 is naturally centered on the center of rotation C of the gear wheel 30.

Figure 5:
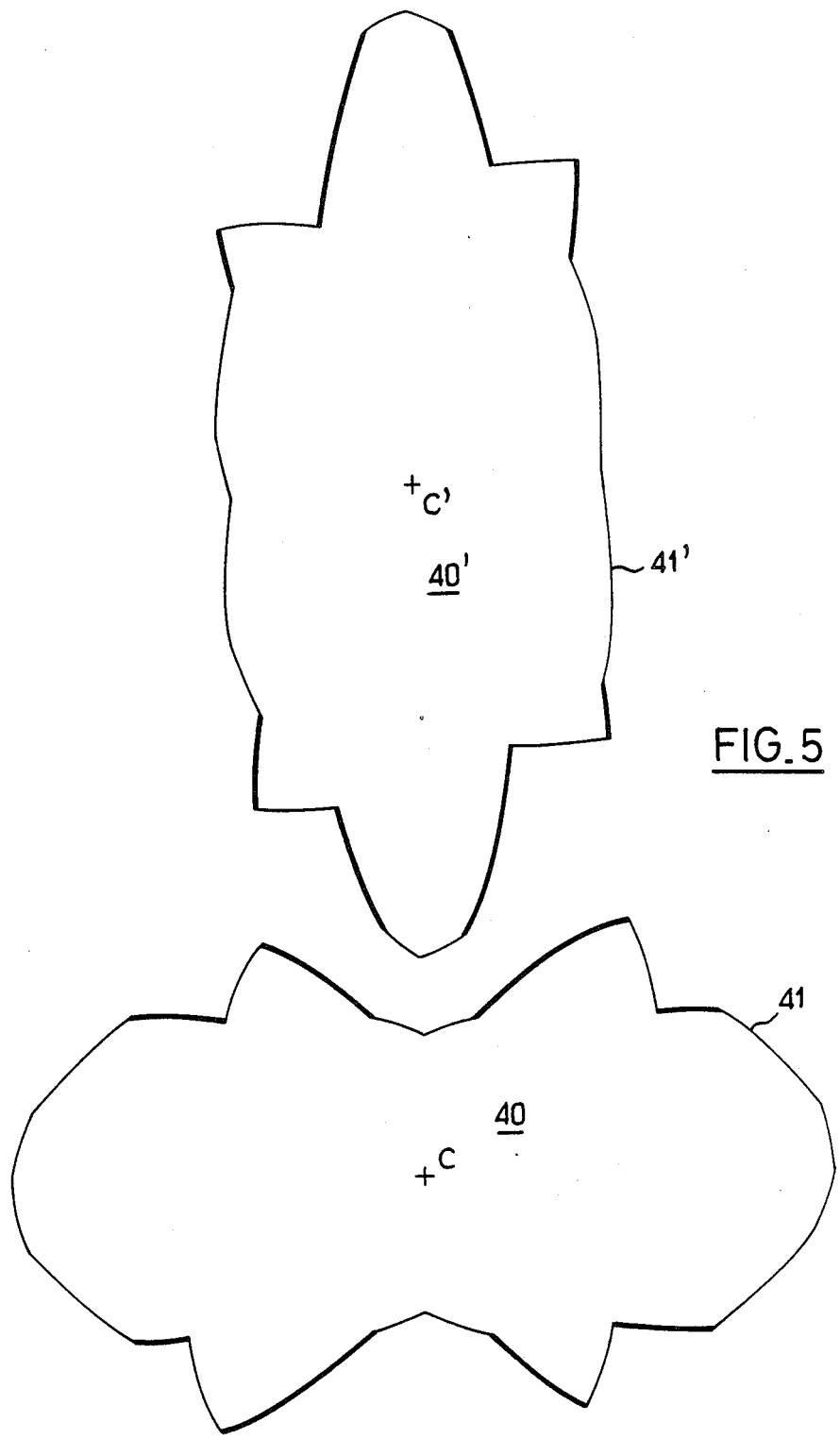
FIG. 5 shows the pitch curves of another pair of gears in accordance with the invention.

Another example of gearing in accordance with the invention is shown in FIG. 5. A first solid 40 has a closed pitch curve 41 constituted by a succession of logarithmic spiral arcs, some of which (drawn in fine lines) are provided with teeth and the others of which (drawn in thick lines) act lke the portions 33 and 33' of the previous figure by themselves satisfying the same meshing requirements as the teeth on either side of them. A second solid 40' has a pitch curve 41' suitable for rolling without sliding over the pitch curve 41 and whose spiral arcs are likewise provided with teeth or not provided with teeth depending on whether they are drawn with fine lines or thick lines.

The advantage of this type of gearing lies in the variation obtained in the motion of the driven solid (e.g. 40') as a function of uniform rotation of the driving solid 40 about its axis C. Thus, by associating two coaxial driven shafts with two driven solids such as 40' but offset from each other by 100 grades, it is possible to obtain relative motion between said two shafts which repeats cyclically, and this may be of use in numerous mechanisms, and in particular in volumetric appartuses.

A priori, any shape of pitch curve can be fitted with standard toothing in accordance with the invention, in particular elliptical curves can be fitted with standard toothing.

By extension, a pitch curve comprising a succession of elliptical, circular, and/or logarithmic spiral arcs may be fitted with toothing regardless of whether the pitch curve is open or closed. Meshing pairs can thus be designed where one and/or the other may be multi-lobed or in the form of a rack. Naturally, the invention also extends to toothed sectors cooperating with each other or with racks.

Helical or herringbone type toothing can be provided from profiles in accordance with the invention using the same technique as is used for converting conventional straight toothing into helical or herringbone toothing (i.e. progressively angularly shifting successive tooth planes along the axis of rotation of the axoid).

The invention is applicable to the mechanical transmission of motion.

I claim:

1. A tooth for coupling by meshing two solids which roll over each other along their respective pitch curves without sliding, said curves being other than entirely circular, wherein the profile of the active surface of the tooth is constituted by a foot flank portion situated inside the pitch curve and in the form of a involute of a circle determined for a given pressure angle, and by a head flank portion outside the pitch curve, in which portion, the instantaneous point of contact between the head flank portion of the tooth and the foot flank portion of the co-operating tooth is situated on the tangent to the circle defining the foot flank portion and passing through the instantaneous point of contact between the pitch curves.

2. Toothing comprising a plurality of teeth according to claim 1, wherein the pitch curve includes at least one toothed arc of one of the following shapes: logarithmic spiral and ellipse.

3. Toothing according to claim 2, wherein the pitch curve includes at least one circular-shaped toothed arc which corresponds to one of the following special cases: a logarithmic spiral having a right angle as its characteristic angle; and an ellipse whose focuses coincide.

4. Toothing according to claim 2, including, between two toothed portions of arc, an arc of the pitch curve having no teeth and constituted by an arc which is tangential at its ends to the flank foot and the head flank respectively of the teeth which it interconnects, and which is itself in one of the following shapes: logarithmic spiral and ellipse.

5. Gearing equipped with toothing according to claim 2, wherein each of the solids constituting the gearing has a closed pitch curve constituted by a succession of conjugate arcs selected from the following shapes: circular, elliptical, and logarithmic spiral.

6. Gearing according to claim 5, of one of the following types: rack-and-pinion and toothed sector; wherein at least one of the solids includes an open pitch curve.

7. Gearing according to claim 5, wherein the toothed portions of the pitch curve have teeth in one of the following configurations: helical and herringbone.

* * * * *